(12) United States Patent  
Hsieh et al.

(10) Patent No.: US 7,681,150 B2  
(45) Date of Patent: Mar. 16, 2010

(54) DEVICE AND METHOD FOR PROCESSING INFORMATION

(75) Inventors: Kuan-Hong Hsieh, Tu-Cheng (TW); Xin Lu, Shenzhen (CN); Xiao-Guang Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 604 days.

(21) Appl. No.: 11/227,480

(22) Filed: Sep. 15, 2005

(65) Prior Publication Data

US 2006/0069997 A1    Mar. 30, 2006

(30) Foreign Application Priority Data

Sep. 24, 2004    (TW)    ............................ 93128986 A

(51) Int. Cl.  
*G06F 3/048* (2006.01)

(52) U.S. Cl. ........................ 715/854; 715/810; 715/835

(58) Field of Classification Search ................. 715/721, 715/810, 854, 968, 834, 853, 835; 725/39, 725/45; 707/104.1  
See application file for complete search history.

(56) References Cited

U.S. PATENT DOCUMENTS

| | | | |
|---|---|---|---|
| 5,396,264 A * | 3/1995 | Falcone et al. ............... | 715/811 |
| 5,940,076 A * | 8/1999 | Sommers et al. ............. | 715/834 |
| 6,819,344 B2 * | 11/2004 | Robbins ...................... | 715/848 |
| 2002/0054164 A1 | 5/2002 | Uemura | |
| 2002/0126121 A1* | 9/2002 | Robbins ...................... | 345/440 |
| 2003/0001881 A1* | 1/2003 | Mannheimer et al. ........ | 345/728 |
| 2004/0250217 A1* | 12/2004 | Tojo et al. .................... | 715/810 |
| 2006/0048076 A1* | 3/2006 | Vronay et al. ............... | 715/850 |

FOREIGN PATENT DOCUMENTS

| | | |
|---|---|---|
| CN | 1322992 A | 11/2001 |
| CN | 1525286 A | 9/2004 |

* cited by examiner

*Primary Examiner*—Namitha Pillai  
(74) *Attorney, Agent, or Firm*—Zhigang Ma

(57) ABSTRACT

A method for processing information includes steps of: classifying a plurality of files into a plurality of groups, and each group is represented by one or more displayable images; designating each group according to a hierarchy of the groups; displaying images of one or more groups in a same level of the hierarchy in the form of a first virtual ellipse; locating centers of the displayed first virtual ellipses along a path of a second virtual ellipse; wherein a selected one of the groups in the same level of the hierarchy has its first virtual ellipse displayed in a size larger than that of any other displayed first virtual ellipse, a selected one of the images of the first virtual ellipse of the selected group is displayed in an active area of the first virtual ellipse of the selected group.

14 Claims, 7 Drawing Sheets

DEVICE AND METHOD FOR PROCESSING INFORMATION

BACKGROUND OF THE INVENTION

1. Field of the Invention

The present invention relates to electronic information processing devices and methods, and particularly to an information displaying and selecting device and method for displaying information of a plurality of file folders in a visually intuitive and convenient way.

2. General Background

In a conventional information processing apparatus such as for a personal computer or the like, a tree construction for showing folders and files is employed to search for and read various files. The tree construction may be difficult or cumbersome to use, particularly when the size of the corresponding display is limited, such as in portable electronic devices.

Other means and methods for showing folders and files are available in the market. For example, reference is made to US patent application publication No. 2002/0054164, published on May 9, 2002, and entitled "Information Processing Apparatus and Method, and Program Storage Medium." The patent application discloses a method for processing information. The method includes steps of: forming at least a part of a three-dimensional body by a plurality of panels having attached thereto images corresponding to a plurality of files or folders attached on a screen of an image display means; and display at least a panel by rendering a virtual ellipse for the panel closest to and parallel with the screen. The method provides an interface for displaying images of folders and files. However, the method is relatively complex and non-intuitive for lay users, and operation of the apparatus is inconvenient.

Therefore, a heretofore unaddressed need exists in the industry to address the aforementioned deficiencies and inadequacies.

SUMMARY

The present invention provides a device and method for processing information. The present invention provides a concise and intuitional interface for displaying file folders. Visibility of the interface is improved, and accordingly operability of the device for processing information is increased.

The present invention provides a device for processing information. The device for processing information includes a memory, an input unit, a micro-programmed unit (MCU) and a display unit. The memory stores a plurality of files and images, the files are classified into a plurality of groups, and each group is represented by one or more displayable images. The input unit generates control signals according to operations of a user. The MCU designates each group according to a hierarchy of the groups. Images of one or more groups in a same level of the hierarchy are each displayed in the form of a first virtual ellipse on the display unit, centers of the displayed first virtual ellipses are located along a path of a second virtual ellipse. A selected one of the groups in the same level of the hierarchy has its first virtual ellipse displayed in a size larger than that of any other displayed first virtual ellipse. A selected one of the images of the first virtual ellipse of the selected group is displayed in an active area of the first virtual ellipse of the selected group. The selected group can be changed to a new selected group according to corresponding control signals. The display unit displays at least a part of the images.

The present invention also provides a method for processing information. The method includes steps of: classifying a plurality of files into a plurality of groups, and each group is represented by one or more displayable images; designating each group according to a hierarchy of the groups; displaying images of one or more groups in a same level of the hierarchy in the form of a first virtual ellipse; locating centers of the displayed first virtual ellipses along a path of a second virtual ellipse; wherein a selected one of the groups in the same level of the hierarchy has its first virtual ellipse displayed in a size larger than that of any other displayed first virtual ellipse, a selected one of the images of the first virtual ellipse of the selected group is displayed in an active area of the first virtual ellipse of the selected group, the selected group can be changed to a new selected group according to corresponding control signals.

Other systems, methods, features, and advantages will be or become apparent to one with skill in the art upon examination of the following drawings and detailed description. It is intended that all such additional systems, methods, features, and advantages be included within this description, be within the scope of the present invention, and be protected by the accompanying claims.

DETAILED DESCRIPTION OF THE PREFERRED EMBODIMENTS

One exemplary embodiment of the present invention is a media player such as an MP3 player. The MP3 player can display parts of a song folder via a concise and intuitional interface. The following detailed description is provided with reference to the attached drawings.

Figure 1:
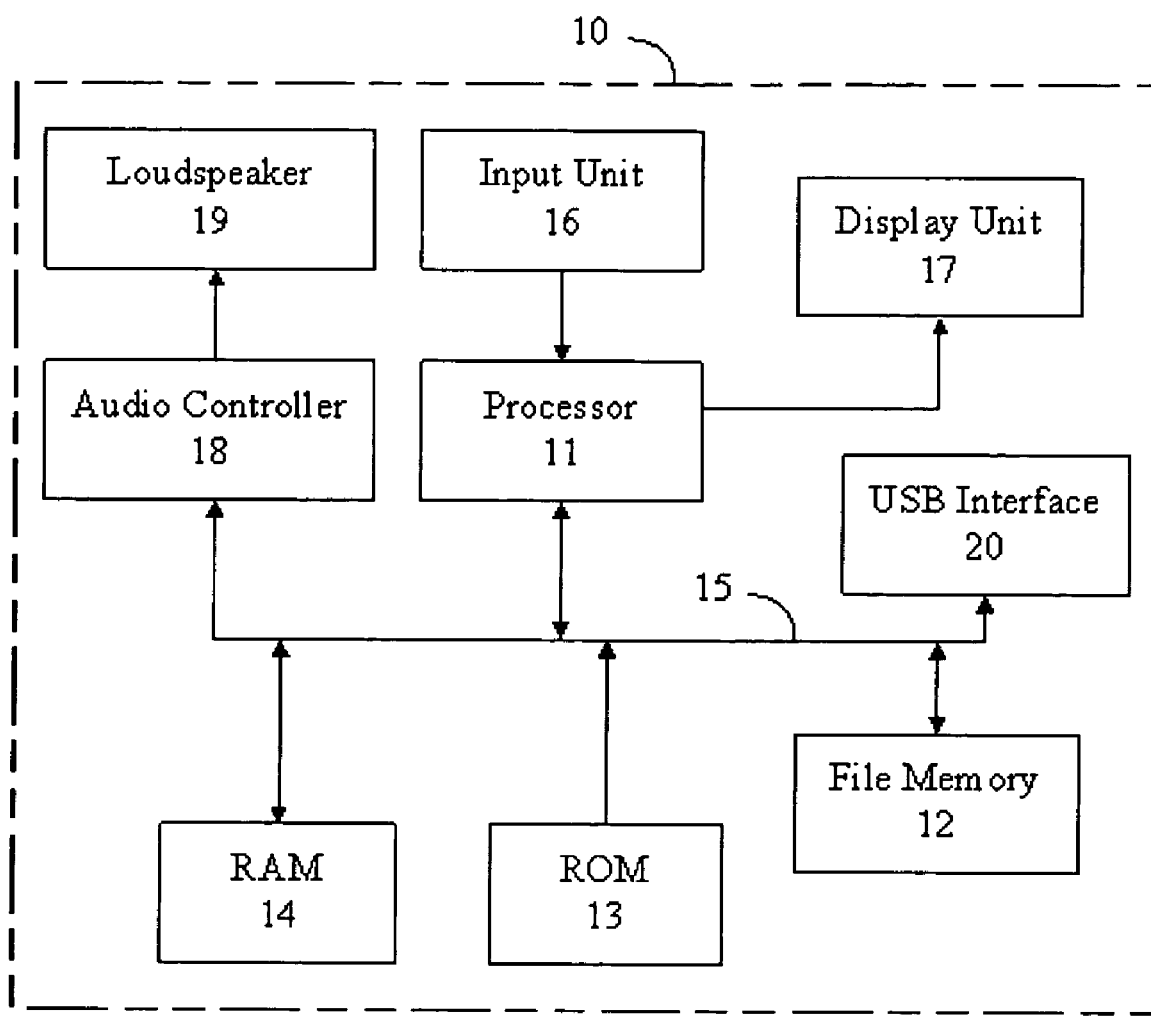
FIG. 1 is a block diagram of hardware infrastructure of an MP3 (Moving Picture Experts Group, audio layer 3) player in accordance with a preferred embodiment of the present invention.

FIG. 1 is a block diagram of hardware infrastructure of an MP3 player in accordance with the preferred embodiment of the present invention. The MP3 player 10 includes a processor 11, a file memory 12, a read only memory (ROM) 13, a random access memory (RAM) 14, a bus 15, an input unit 16, a display unit 17, an audio controller 18, a loudspeaker 19, and a universal serial bus (USB) interface 20. The file memory 12, the ROM 13, the RAM 14, the audio controller 18, the loudspeaker 19 and the USB 20 are connected respectively to the processor 11 via the bus 15. The input unit 16 and the display unit 17 are connected directly to the processor 11. The loudspeaker 19 is connected directly to the audio controller 18.

The processor 11 controls the MP3 player 10 to operate, and can be a microprocessor or a controller. The file memory 12 stores a plurality of song files, and can be a hard disk or a flash. The ROM 13 stores non-volatile application programs run by the processor 11. The application programs are used for driving an interface showing parts of the song folder including song files, and for selecting a song file to play. The RAM 14 temporarily stores song files that the processor 11 is to process. The bus 15 transmits the song files and control signals. The input unit 16 generates and sends control signals in response to operations of a user. The input unit 16 can be in the form of buttons, knobs, touch pads, or the like. The display unit 17 displays video signals received from the processor 11. The audio controller 18 processes the song files to generate audio signals, and sends the audio signals to the loudspeaker 19. The loudspeaker 19 receives the audio signals and outputs corresponding sounds. The loudspeaker 19 can be external or internal to the MP3 player 10. For example, an earphone is a type of loudspeaker 19 external to the MP3 player 10. The USB interface 20 connects to an external song files resource (not shown); for example, a computer or a server. Thereupon, the MP3 player 10 downloads the song files from the external song files resource via the USB interface 20 if desired. The components of the MP3 player 10 are otherwise conventional, and for the sake of brevity will not be discussed in further detail herein.

Figure 2:
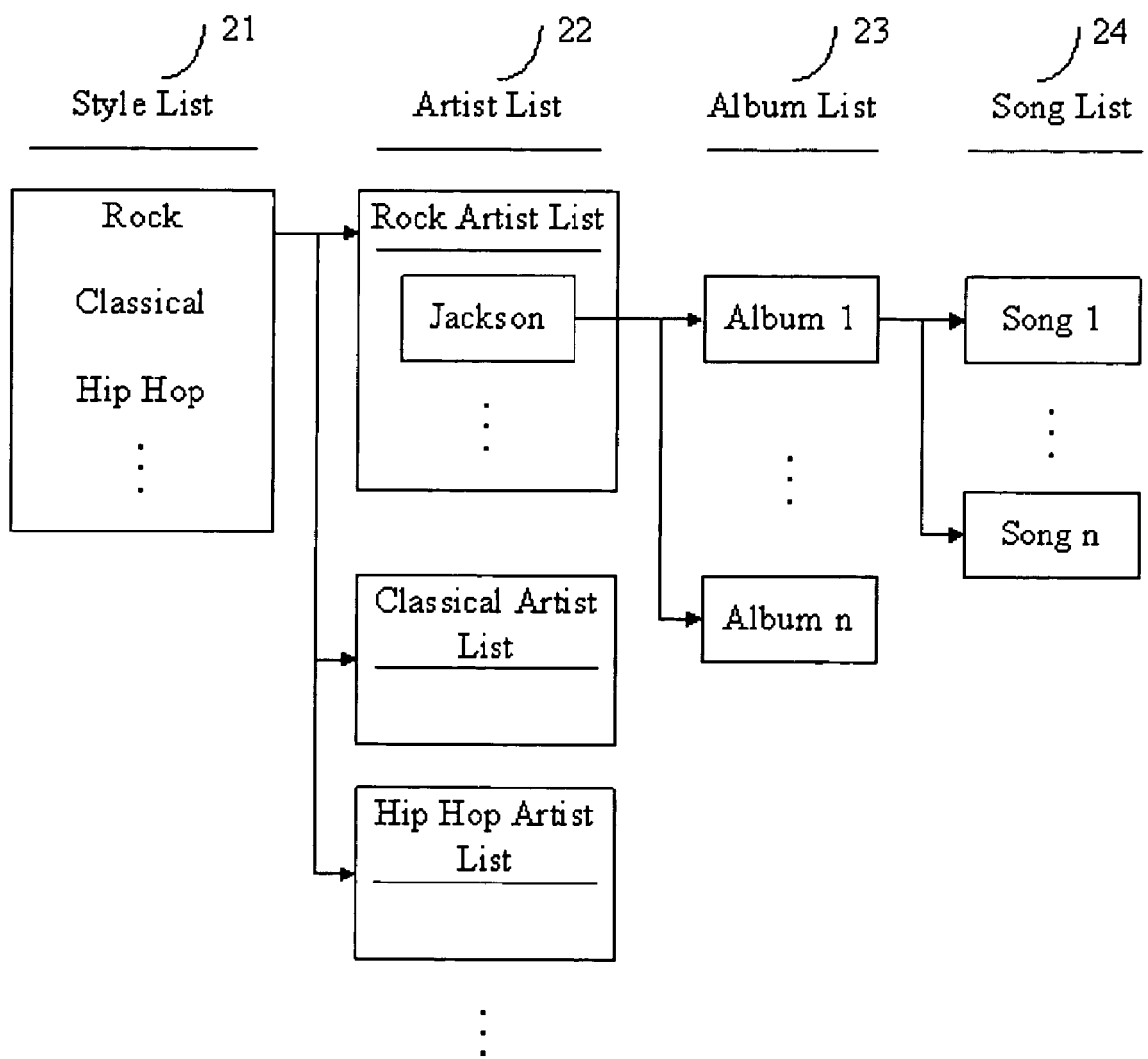
FIG. 2 is a schematic diagram showing a hierarchical arrangement of a song folder in accordance with the preferred embodiment of the present invention.

FIG. 2 is a schematic diagram showing a hierarchical arrangement of a song folder in accordance with the preferred embodiment of the present invention. Generally, song files are created based on a given distinct musical style, such as Classical, Jazz, Hip-Hop, etc. Consequently, systems and methods for managing the song files classify and group the songs according to their distinct musical style. Similarly, in this embodiment, the MP3 player 10 groups the song files according to their musical styles. Therefore, a style list 21 including various style groups (e.g., Rock, Classical, and Hip Hop) is generated and provided as a first level of the song folder. Each style group corresponds to an artist list 22. The artist list 22 is designated as a second level of the song folder, and includes one or more artists. Each artist possesses an album list 23. The album list 23 is designated as a third level of the song folder, and includes one or more albums (symbolically depicted as album 1 through album n). Each album corresponds to a song list 24. The song list 24 is designated as a fourth level of the song folder, and includes a plurality of songs. Each of the style groups, artists, albums and songs can be represented by a corresponding image. The image can be a picture, one or more words, or a composition of a picture and one or more words. For example, the style group is represented by its name; the artist is represented by his/her photograph; the album is represented by its cover picture; and the song is represented by its name. Each of the levels of the song folder is presented in a similar form and is described more fully below.

Figure 3:
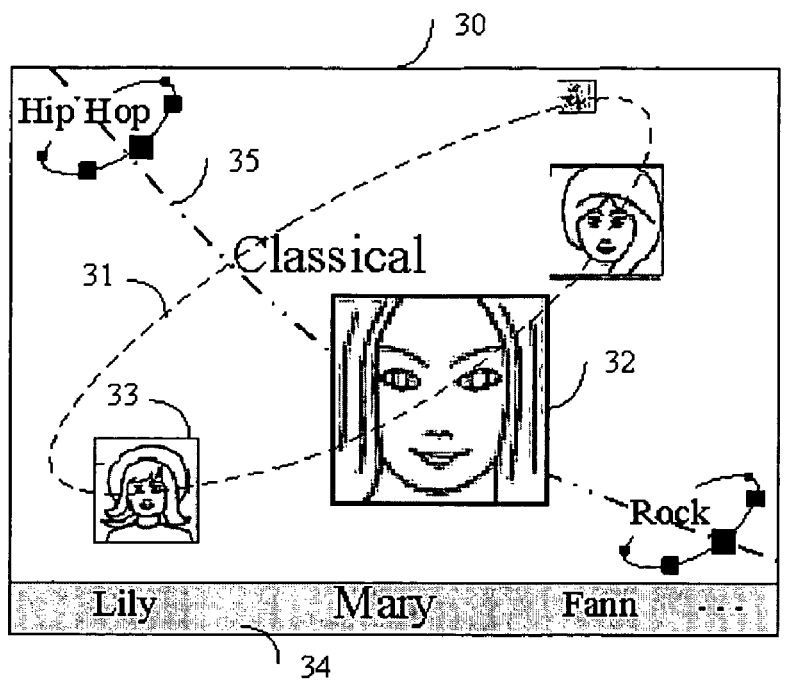
FIG. 3 is a view of a display screen of the MP3 player of FIG. 1, showing an expanded state of a first level of the song folder in accordance with the preferred embodiment of the present invention.

FIG. 3 is a view of a display screen of the MP3 player 10, showing an expanded state of the first level of the song folder in accordance with the preferred embodiment of the present invention. For simplicity, only three of style groups are displayed on the display screen 30. Artists (symbolically represented by their photographs) of each style group (e.g., Hip-Hop, Classical, and Rock) are arranged along a path of a virtual ellipse (e.g., a virtual ellipse 31) along a visual plane on the screen for that style group. Each virtual ellipse is accompanied by the corresponding style name (i.e., Hip-Hop, Classical, and Rock). For example, the virtual ellipse 31 is accompanied by the style name Classical. Furthermore, centers of the virtual ellipses of the style groups are arranged along a path of a virtual ellipse 35. The virtual ellipse 31 corresponds to a desired style group (i.e., Classical), and is displayed in a larger size. Other virtual ellipses correspond to other style groups (i.e., Hip-Hop, Rock), and are displayed in a smaller size. Additionally, with regard to the desired style group, the artist in an active area 32 of the virtual ellipse 31 is displayed in a larger size, whereas other artists (e.g., the artist in an area 33) are displayed in a smaller size. The artist in the active area 32 is displayed in a particular desired mode, such as a flashing mode or a steady mode. Names of the artists in and adjacent to the active area 32, including in the area 33, are respectively displayed in a content area 34. In the illustrated embodiment, the content area 34 is in the form of a bar at the bottom of the display screen 30. However, in other embodiments, the content area 34 can have another desired shape and/or size and/or be located at any other position on the display screen 30. Furthermore, when an artist is shown anywhere on the display screen 30 other than in the active area 32 of the virtual ellipse 31 (e.g. in the area 33), the artist can be displayed in a faint mode.

Figure 4:
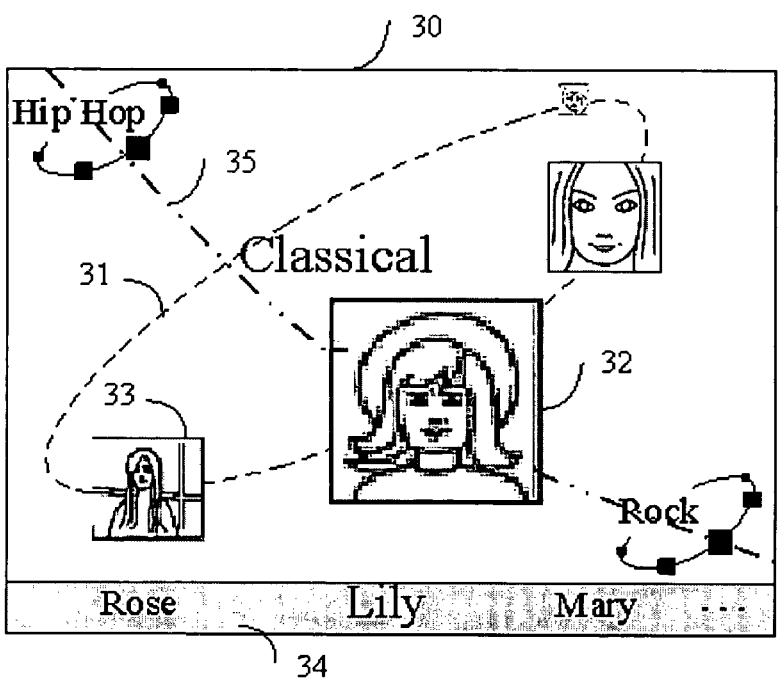
FIG. 4 is similar to FIG. 3, but showing the display screen after a user has selected a new desired artist in a desired style group.

FIG. 4 is similar to FIG. 3, but showing the display screen 30 after a user has selected a new desired artist in the desired style group. In the present embodiment, the user can select a desired object (i.e., style group, artist, album, and song) utilizing the input unit 16. The input unit 16 may comprise a keyboard and a computer mouse. For example, if the user presses an up key (or a down key) of the keyboard, the artists of the desired group are moved along the virtual ellipse 31 in a corresponding direction (i.e., counterclockwise or clockwise). Alternatively, the user may select a photograph of an artist of the desired group by, say, clicking on the photograph with the mouse. Once the selection operation is made, the selected artist of the desired group is moved to the active area 32 along the virtual ellipse 31 in a predetermined direction (i.e., clockwise or counterclockwise), and other artists of the same style group are moved along the virtual ellipse 31 in the same direction. For example, if the user clicks on the artist (i.e., Lily) on the area 33 in FIG. 3, all the artists of the desired style group (i.e., Classical) are moved counterclockwise one position along the virtual ellipse 31. Thus the selected artist (i.e., Lily) reaches the active area 32 of the virtual ellipse 31. Synchronously, the names of the artists of the desired style group are correspondingly moved one position in the content area 34. The desired artist (i.e., Lily) is displayed in a flashing mode or a steady mode in the active area 32, as shown in FIG. 4.

Figure 5:
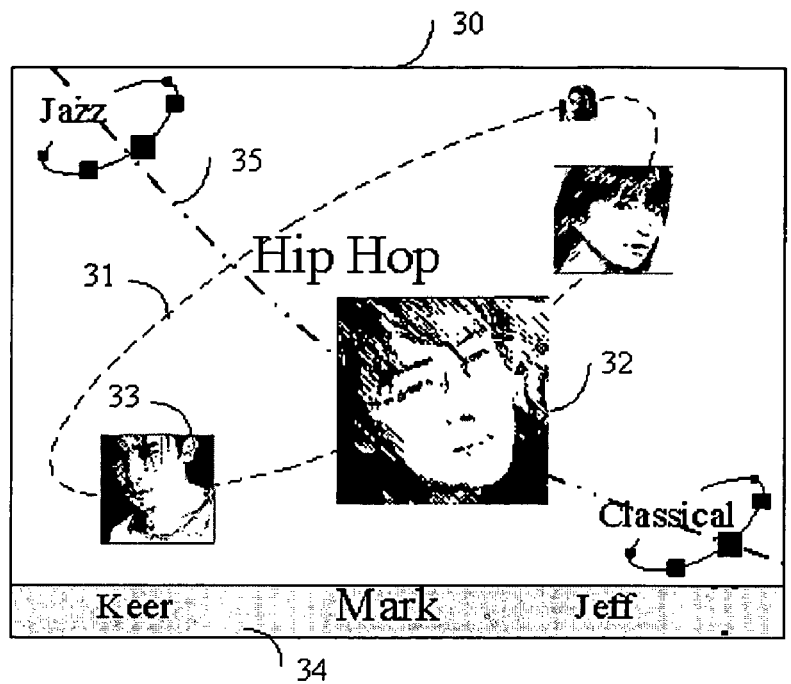
FIG. 5 is similar to FIG. 3, but showing the display screen after the user has selected a new desired style group.

FIG. 5 is similar to FIG. 3, but showing the display screen 30 after the user has selected a new desired style group. Utilizing keyboard and/or mouse modes of operation similar to those described above in relation to FIG. 4, the user can select a new desired style group. For example, the user may select a new desired style group through the keyboard. When the user presses a right key (or a left key), all style groups of the first level of the song folder are moved along the virtual ellipse 35 in a corresponding direction (i.e., counterclockwise or clockwise), until the new desired style group (i.e., Hip Hop) reaches the position of the virtual ellipse 31, which was previously occupied by the previous desired style group (i.e., Classical). Alternatively, the user may select a new desired style group by, say, clicking on the photograph of one of the artists of that style group with the mouse. Artists of the new desired style group (i.e., Hip Hop) are displayed in expanded form along the virtual ellipse 31. Synchronously, names of artists in and adjacent to the active area 32, including in the area 33, are respectively displayed in the content area 34.

Figure 6:
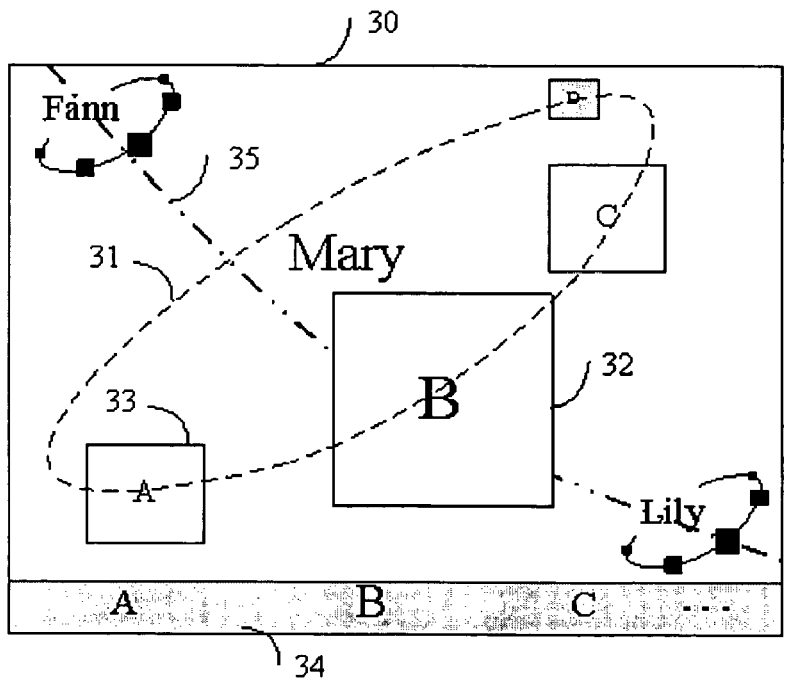
FIG. 6 is a view of the display screen of the MP3 player of FIG. 1, showing an expanded state of a second level of the song folder after an artist has been selected.

FIG. 6 is a view of the display screen 30 of the MP3 player 10, showing an expanded state of the second level of the song folder after an artist has been selected. When the user presses an enter key of the keyboard, the artist (i.e., Mary) in the active area 32 in the first level of the song folder is selected (see FIG. 3), and then the song folder enters the second level. The second level is displayed using a similar arrangement to that of the first level. Albums (e.g., A, B, C and D) of each of artists of the second level of the song folder are arranged in the form of a virtual ellipse (e.g., the virtual ellipse 31), and are accompanied by the corresponding artist name (e.g., Fann, Mary, and Lily). The centers of the virtual ellipses are arranged along a path of the virtual ellipse 35. The virtual ellipse 31 corresponds to the desired artist (i.e., Mary), and is displayed in a larger size. Other virtual ellipses correspond to other artists, and are displayed in a smaller size. The album in the active area 32 of the virtual ellipse 31 is displayed in a larger size, whereas other albums are displayed in a smaller size. The album in the active area 32 is displayed in the desired mode, such as the flashing mode or the steady mode. Names of the albums in and adjacent to the active area 32, including in the area 33, are respectively displayed in the content area 34. When an album is shown anywhere on the display screen 30 other than in the active area 32 of the virtual ellipse 31 (e.g. in the area 33), the album can be displayed in the faint mode. Furthermore, if the user presses a page up button (not shown) on the display screen 30 using the mouse, or presses a page up key of the keyboard, the display screen 30 exits the second level of the song folder and enters the first level.

Figure 7:
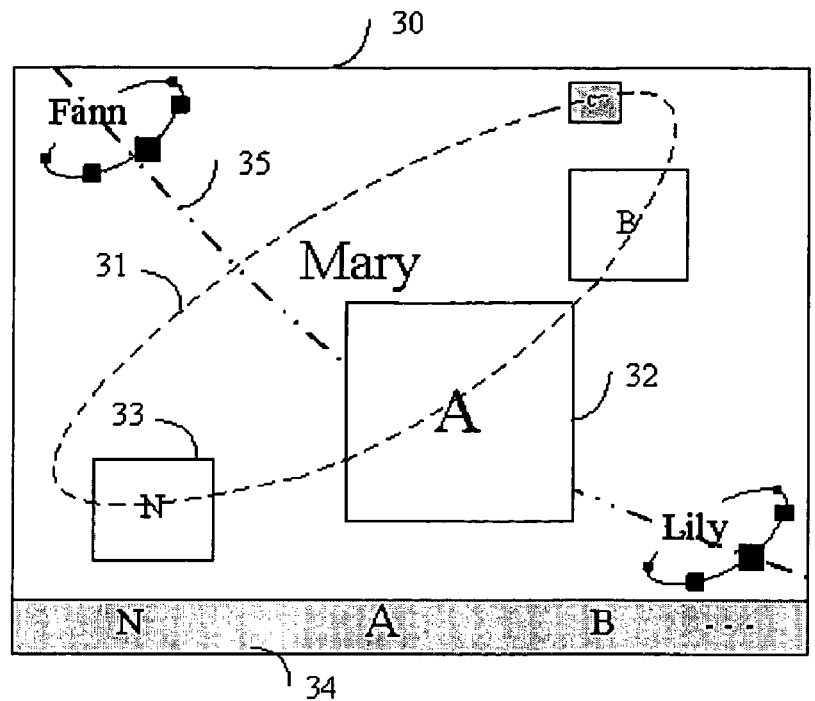
FIG. 7 is similar to FIG. 6, but showing the display screen after the user has selected a new desired album of the desired artist.

FIG. 7 is similar to FIG. 6, but showing the display screen 30 after the user has selected a new desired album of the desired artist. Utilizing the input unit 16 and keyboard and/or mouse modes of operation similar to those described above, the user can select a new desired album. For example, the user may select a new desired album through the keyboard. When the user wants to select the album "A" shown in FIG. 6 as the new desired album, the user presses the up key (or the down key), and albums of the desired artist (i.e., Mary) are moved counterclockwise along the virtual ellipse 31 one position so that the desired album "A" reaches the active area 32 of the virtual ellipse 31. Synchronously, the names of the albums in and adjacent to the active area 32, including in the area 33, are correspondingly moved one position in the content area 34. The desired album "A" is displayed in the flashing mode or the steady mode in the active area 32, as shown in FIG. 7.

Figure 8:
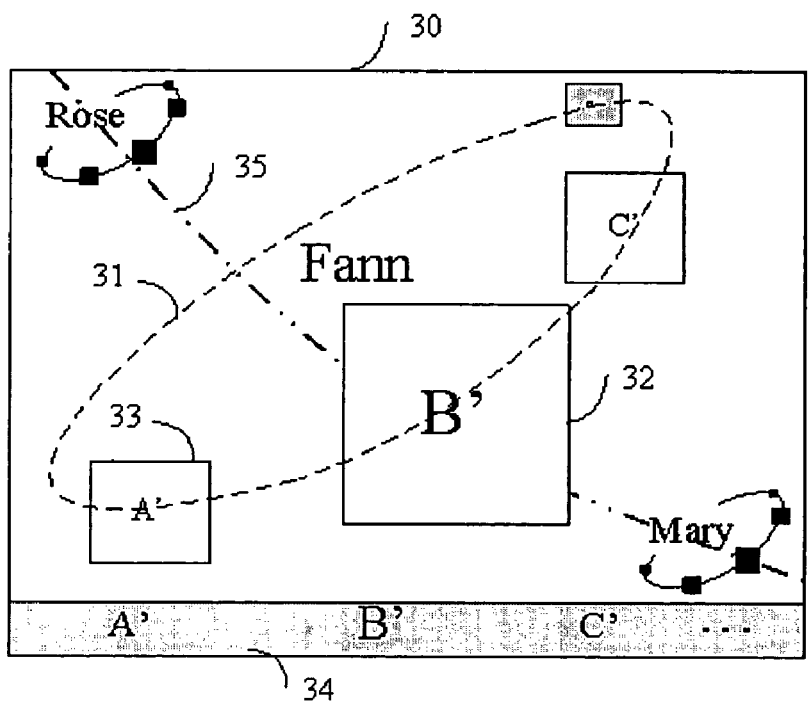
FIG. 8 is similar to FIG. 6, but showing the display screen after the user has selected a new desired artist.

FIG. 8 is similar to FIG. 6, but showing the display screen 30 after the user has selected a new desired artist. When the user wants to select the artist "Fann" shown in FIG. 6 as the new desired artist, the user presses the right key or clicks on the photograph of the artist "Fann." Thus all the artists of the second level of the song folder are moved counterclockwise one position along the virtual ellipse 35, so that the artist "Fann" reaches the position of the virtual ellipse 31, which was previously occupied by the previous desired artist (i.e., Mary). Albums of the new desired artist (i.e., Fann) are displayed in expanded form along the virtual ellipse 31. Synchronously, names of albums in and adjacent to the active area 32, including in the area 33, are displayed in the content area 34.

Figure 9:
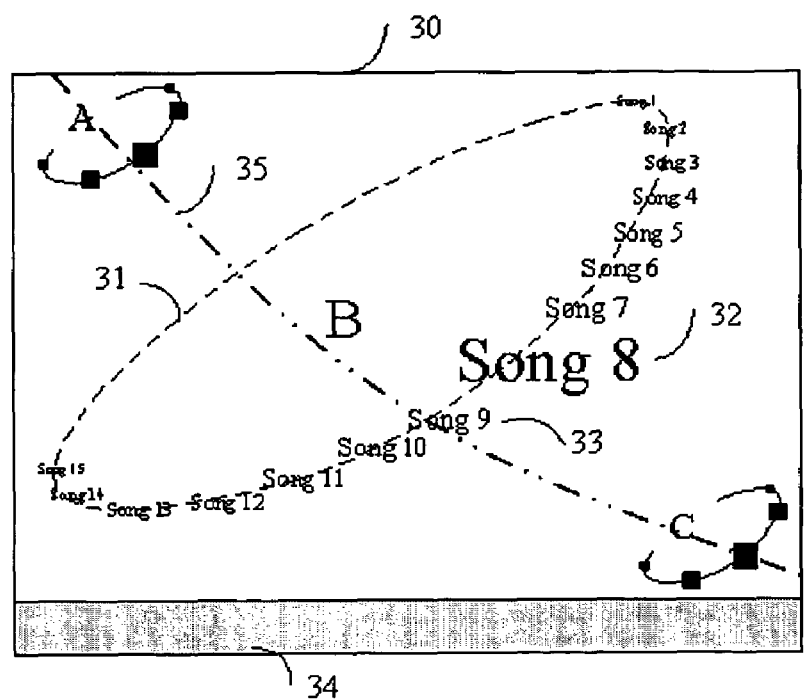
FIG. 9 is a view of the display screen of the MP3 player of FIG. 1, showing an expanded state of a third level of the song folder after an album has been selected.

FIG. 9 is a view of the display screen 30 of the MP3 player 10, showing an expanding state of the third level of the song folder after an album has been selected. When the user presses the enter key when the display screen 30 is as shown in FIG. 6, the album (i.e., B) in the active area 32 in the second level of the song folder is selected, and the song folder enters the third level. The third level is displayed using a similar arrangement to that of the first or second levels. Songs (e.g., Song 7, Song 8, Song 9 etc) of each of albums of the third level of the song folder are arranged in the form of a virtual ellipse (e.g., the virtual ellipse 31), and are accompanied by the corresponding album name (e.g., A, B, and C). The centers of the virtual ellipses are arranged along a path of the virtual ellipse 35. The virtual ellipse 31 corresponds to the desired album (i.e., B), and is displayed in a larger size. Other virtual ellipses correspond to other albums, and are displayed in a smaller size. The song (i.e., Song 8) in the active area 32 of the virtual ellipse 31 is displayed in a larger size, whereas other songs are displayed in a smaller size. Synchronously, information (e.g., artist name and duration) on the song (i.e., Song 8) is displayed in the content area 34 (not shown in FIG. 9). The song (i.e., Song 8) in the active area 32 is displayed in the desired mode, such as the flashing mode or the steady mode. When a song is shown anywhere on the display screen 30 other than in the active area 32 of the virtual ellipse 31 (e.g. in the area 33), the name of the song can be displayed in the faint mode. Furthermore, if the user presses the page up button (not shown) on the display screen 30 using the mouse, or presses the page up key of the keyboard, the display screen 30 exits the third level of the song folder and enters the second level.

Figure 10:
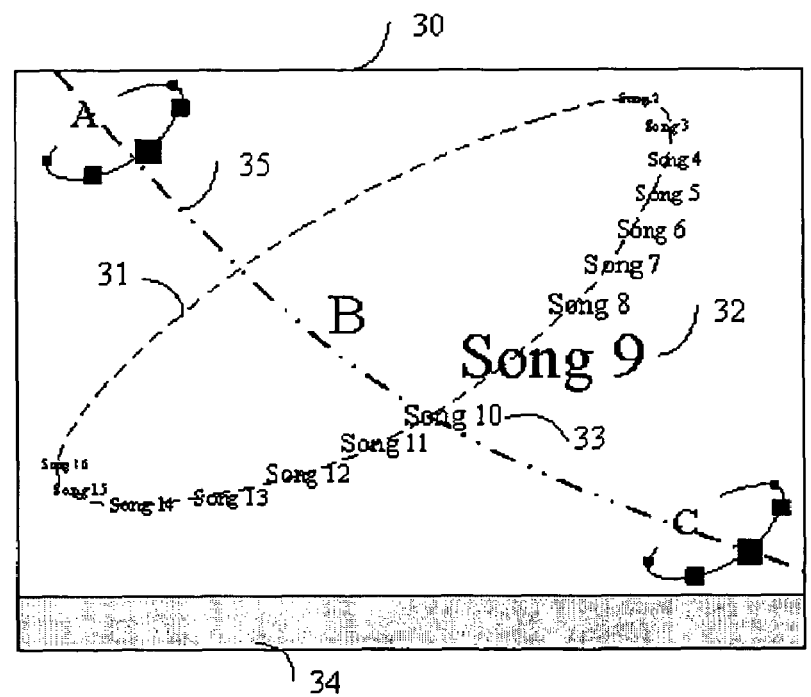
FIG. 10 is similar to FIG. 9, but showing the display screen the user has selected a new desired song of the desired album.

FIG. 10 is similar to FIG. 9, but showing the display screen 30 after the user has selected a new desired song of the desired album. Utilizing the input unit 16 and keyboard and/or mouse modes of operation similar to those described above, the user can select a new desired song. When the user wants to select Song 9 shown in FIG. 9 as the new desired song, the user presses the up key (or the down key) or clicks on the name of Song 9, and songs of the desired album (i.e., B) are moved counterclockwise along the virtual ellipse 31 one position so that the desired Song 9 reaches the active area 32 of the virtual ellipse 31. Synchronously, information (e.g., artist name and duration) on the desired song (i.e., Song 9) is displayed in the content area 34. The desired Song 9 is displayed in the flashing mode or the steady mode in the active area 32, as shown in FIG. 10.

Figure 11:
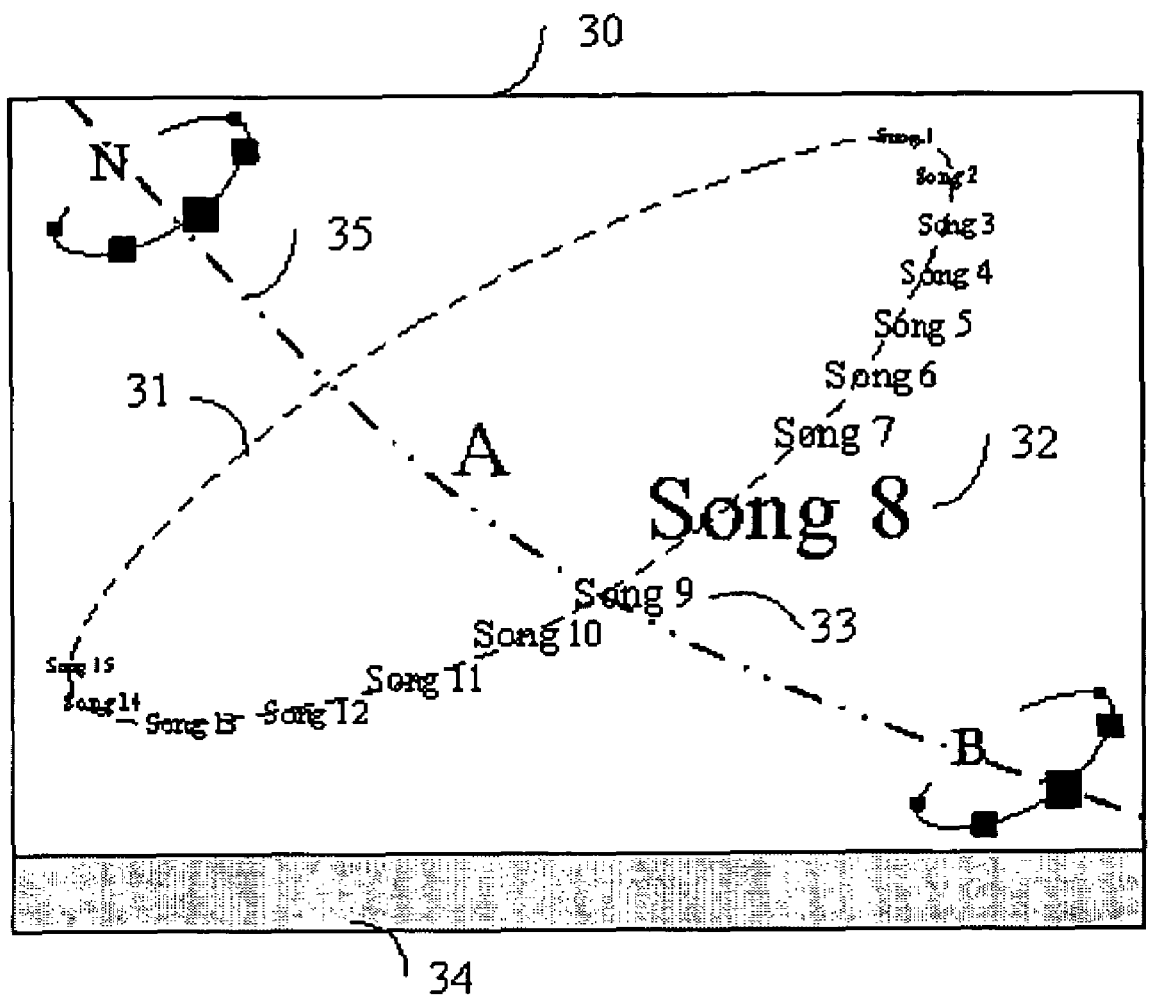
FIG. 11 is similar to FIG. 9, but showing the display screen after the user has selected a new desired album.

FIG. 11 is similar to FIG. 9, but showing the display screen 30 after the user has selected a new desired album. When the user wants to select the album "A" shown in FIG. 9 as the new desired album, the user presses the right key (or the left key) or clicks on the name of album "A". Thus all the albums of the third level of the song folder are moved counterclockwise one position along the virtual ellipse 35, so that album "A" reaches the position of the virtual ellipse 31, which was previously occupied by the previous desired album "B." Songs of the new desired album "A" are displayed in expanded form along the virtual ellipse 31.

As regards any of the display screens 30 shown in FIGS. 9-11, one or more songs of the desired album can be selected. Once the songs are selected, they are played in order of selection. Lyrics of a song currently being played are displayed in the content area 34.

It should be emphasized that the above-described embodiments, including any preferred embodiments, are merely possible examples of implementations, and are merely set forth for a clear understanding of the principles of the invention. Many variations and modifications may be made to the above-described embodiments without departing substantially from the spirit and principles of the invention. All such modifications and variations are intended to be included herein within the scope of this disclosure and the present invention, and be protected by the following claims.

We claim

1. An electronic device for displaying and selecting information, comprising a memory, an input unit, a processor, and a display unit, wherein:

the memory stores a plurality of files and images, the files are classified into a plurality of groups, and each group is represented by one or more displayable images;

the input unit generates control signals according to operations of a user;

the processor designates each group according to a hierarchy of the groups;

images of one or more groups in a same level of the hierarchy are each displayed in the form of a first virtual ellipse on the display unit, centers of the displayed first virtual ellipses are located along a path of a second virtual ellipse;

a selected one of the groups in the same level of the hierarchy has its first virtual ellipse displayed in a size larger than that of any other displayed first virtual ellipse, the selected group can be changed to a new selected group according to corresponding control signals and the new selected group is moved along the second virtual ellipse to a position where is occupied by the previously selected group;

images of the first virtual ellipse of the selected group are movable along the first virtual ellipse, wherein when one of the images is moved toward an active area, dimension of the one of the images becomes larger; when one of the images is moved away from the active area and toward a furthest position, dimension of the one of the images becomes smaller; after one of the images is moved out of the furthest position, the one of the images vanishes;

after the user selects an image in the active area of the selected group, files corresponding to each of the images of the selected group are displayed in the form of the first virtual ellipse; and the display unit displays at least a part of the images.

2. The device according to claim 1, wherein one of the images that is moved into the active area of the selected group is displayed in a size larger than any other images of the selected group.

3. The device according to claim 1, wherein the processor moves the groups in the same level of the hierarchy along the second virtual ellipse in the predetermined direction until a desired group reaches the first virtual ellipse which is across the active area.

4. The device according to claim 1, wherein the processor moves the images of the desired group along the first virtual ellipse of the desired group in a predetermined direction until a desired group reaches an active area of the first virtual ellipse.

5. The device according to claim 1, wherein the desired image in the active area is displayed in a particular mode, the particular mode being selected from the group consisting of a flashing mode and a steady mode.

6. The device according to claim 1, wherein names of the images in and adjacent to the active area are respectively displayed on a content area.

7. The device according to claim 1, wherein the first virtual ellipse corresponding to the files that correspond to the image in the active area is displayed in a size larger than any other first virtual ellipse.

8. A method for displaying and selecting information, comprising the steps of:

classifying a plurality of files into a plurality of groups, and each group is represented by one or more displayable images;

designating each group according to a hierarchy of the groups;

displaying images of one or more groups in a same level of the hierarchy in the form of a first virtual ellipse;

locating centers of the displayed first virtual ellipses along a path of a second virtual ellipse;

wherein a selected one of the groups in the same level of the hierarchy has its first virtual ellipse displayed in a size larger than that of any other displayed first virtual ellipse, the selected group can be changed to a new selected group according to corresponding operations of a user and the new selected group is moved along the second virtual ellipse to a position where is occupied by the previously selected group; images of the first virtual ellipse of the selected group are movable along the first virtual ellipse, wherein when one of the images is moved toward an active area, dimension of the one of the images becomes larger; when one of the images is moved away from the active area and toward a furthest position, dimension of the one of the images becomes smaller; after one of the images is moved out of the furthest position, the one of the images vanishes; after the user selects an image in the active area of the selected group, files corresponding to each of the images of the selected group are displayed in the form of the first virtual ellipse.

9. The method according to claim 8, wherein one of the images that is moved into the active area of the selected group is displayed in a size larger than any other images of the selected group.

10. The method according to claim 8 also comprising a step moves the groups in the same level of the hierarchy along the second virtual ellipse in the predetermined direction until a desired group reaches the first virtual ellipse which is across the active area.

11. The method according to claim 8 also comprising a step moves the images of the desired group along the first virtual ellipse of the desired group in a predetermined direction until a desired group reaches an active area of the first virtual ellipse.

12. The method according to claim 8, wherein the desired image in the active area is displayed in a particular mode, the particular mode being selected from the group consisting of a flashing mode and a steady mode.

13. The method according to claim 8, wherein names of the images in and adjacent to the active area are respectively displayed on a content area.

14. The method according to claim 8, wherein the first virtual ellipse corresponding to the files that correspond to the image in the active area is displayed in a size larger than any other first virtual ellipse.

* * * * *